United States Patent [19]

Ten Vaarwerk

[11] Patent Number: 5,328,347
[45] Date of Patent: Jul. 12, 1994

[54] DEVICE FOR INTRODUCING A PLASTIC MATERIAL INTO A MOULD CAVITY

[75] Inventor: Gerardus J. M. Ten Vaarwerk, Beek, Netherlands

[73] Assignee: AMCO Hi-Tech B.V., Netherlands

[21] Appl. No.: 945,808

[22] Filed: Sep. 16, 1992

[30] Foreign Application Priority Data

Sep. 16, 1991 [NL] Netherlands ................... 9101558

[51] Int. Cl.[5] ................... B29C 45/02; B29C 45/76; B29C 45/84
[52] U.S. Cl. ................... 425/116; 425/136; 425/145; 425/151; 425/159; 425/544; 264/272.17
[58] Field of Search ............... 425/136, 151, 145, 159, 425/116, 190, 192 R, 544, 588, DIG. 228, 146; 264/272.17, 40.1; 249/95, 102

[56] References Cited

U.S. PATENT DOCUMENTS

| | | | |
|---|---|---|---|
| 3,799,031 | 3/1974 | Hallenbeck et al. | 91/189 |
| 4,060,362 | 11/1977 | Wilson, III | 425/145 |
| 4,120,631 | 10/1978 | Leutner et al. | 425/145 |
| 4,146,601 | 3/1979 | Bishop | 425/145 |
| 4,386,898 | 7/1983 | Sera | 425/544 |
| 4,407,649 | 10/1983 | Saito | 425/145 |
| 4,511,317 | 4/1985 | Bandoh | 425/116 |
| 4,954,301 | 9/1990 | Saeki et al. | 425/145 |
| 5,158,780 | 10/1992 | Schraven et al. | 425/116 |

FOREIGN PATENT DOCUMENTS 0124244 3/1984 European Pat. Off. .
292722 6/1916 Fed. Rep. of Germany .

OTHER PUBLICATIONS

Patent Abstracts of Japan, vol. 11, No. 50 (M-562) (2497) Feb. 17, 1987 & JP,A,61 215 022 (Hitachi) Sep. 24, 1986 zie samenvatting.
Patent Abstracts of Japan, vol. 13, No. 320 (M-853) (3668) Jul. 20, 1989 & JP,A,1 105 716 (Matsushita Electric Ind. Co. Ltd.) Apr. 24, 1989 zie samenvatting.
Patent Abstracts of Japan, vol. 12, No. 360 (M-746) (3207) Sep. 27, 1988 & JP,A,63 115 710 (Matsushita Electric Ind. Co. Ltd.) May 20, 1988 zie samenvatting.

Primary Examiner—Khanh Nguyen
Attorney, Agent, or Firm—Webb Ziesenheim Bruening Logsdon Orkin & Hanson

[57] ABSTRACT

Device for injecting a plastic material into a mould cavity. In the device, the plastic is moved into the mould cavity by a plunger. The first part of the press stroke is used to transport the material and has to be carried out at relatively low pressure and over a relatively long transport path. The second part of the press stroke is used to fill the mould completely and takes place at relatively high pressure and virtually no stroke. According to the invention, the two movements are effected by different mechanisms which are specifically adapted to carry out these movements. In this arrangement, it becomes possible also to provide a safety coupling to prevent the device being overloaded while working at relatively low pressure.

20 Claims, 7 Drawing Sheets

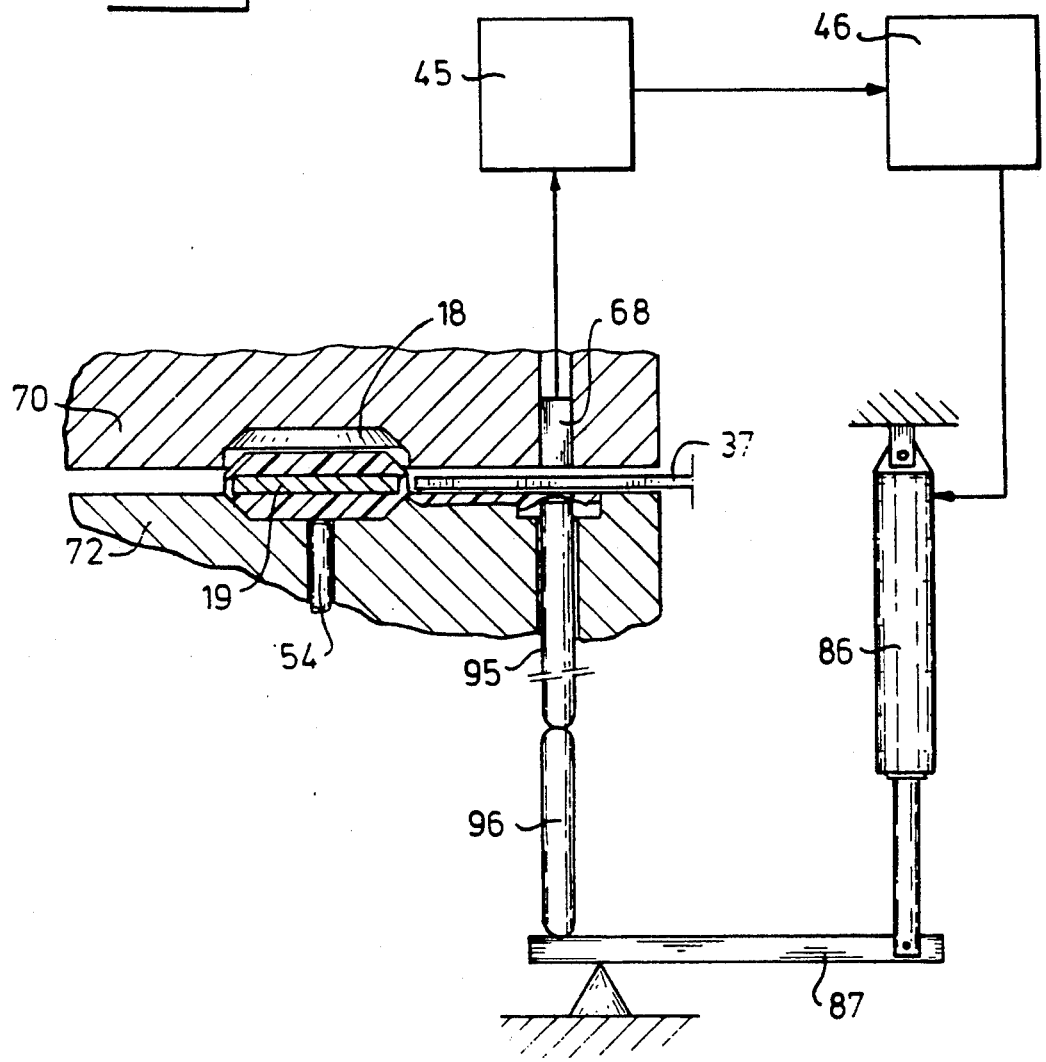

DEVICE FOR INTRODUCING A PLASTIC MATERIAL INTO A MOULD CAVITY

BACKGROUND OF THE INVENTION

1. Field of the Invention

The present invention relates to a device for introducing a plastic material into a mould, after the mould cavity has been closed, by means of a press plunger which is fitted on a carriage, which carriage is fitted displaceable relative to the mould in order to allow the press plunger, using a first drive, to carry out a first movement with a large stroke at controlled speed and at relatively low pressure, the press plunger being designed to be displaceable with respect to the carriage in order to allow the press plunger, using a second drive, to carry out a second movement with a smaller stroke at a relatively high pressure.

2. Description of the Related Art

Such a device is known from U.S. Pat. No. 4,511,317 which discloses a press plunger which makes use of hydraulic jacks.

The state of the art comprises various kinds of hydraulic and mechanical presses which can cover a long transport path as well as provide a relatively high pressure at the end of the stroke.

However, a number of disadvantages are associated with the use of such systems. Hydraulic systems are always liable to slight leaks, as a result of which it is hardly possible, or only possible with great effort, to fulfil the requirements of a so-called clean room. In the case of mechanical systems, it has hitherto been common practice to use springs. The final pressure is applied to the plastic in a static state since the plastic fluid which has been introduced into the mould cavities is barely compressible. By fitting springs and compressing these to some degree, it is possible in the case of mechanical systems to determine the final pressure. In addition, there are variations in the vertical position of the plungers as a result of tolerances in the amount of plastic introduced.

The disadvantage associated with the use of springs is that, because of friction, compression of the springs always takes place joltingly. As a result thereof, the flow of plastic during the stage of filling the mould is also liable to jolts. Therefore there is a risk that the connection between the chip and the substrate (the gold wires) is damaged. When the mould cavities are being filled, the primary concern is the speed control of the flow, the pressure being of less importance. Moreover, because of the various positions of the springs, the process conditions under which the products are manufactured are never identical and therefore reproducibility is very difficult to achieve. As a consequence of the use of springs in mechanical systems, when moulding is carried the static state, i.e. when the pressure is increased at the end of the stroke, the occurrence of pressure waves in the plastic cannot be prevented, which, on the one hand, is disadvantageous for the end product and, on the other hand, subjects the system to unnecessary forces. In addition, reproducibility cannot be guaranteed. Moreover, it is important with all systems to control the final pressure in order to ensure optimum hardening of the plastic without overloading the device.

The object of the present invention is to avoid the disadvantages mentioned above.

SUMMARY OF THE INVENTION

In a device described above, this object is achieved in that the first drive comprises a mechanical drive, the stroke of which is set by the control of the drive, which first drive is connected to the press plunger via a safety coupling, in that the second drive comprises a pneumatic jack device, and in that sensing means are present in the mould for determining the pressure prevailing therein, which sensing means are connected to the control of the pneumatic jack device.

The invention is based on the appreciation that the movement should be carried out over a relatively large distance at low pressure and by mechanical means. A mechanical drive of this kind is of such design that the position of the plunger is known exactly as a result of its operation. That is to say that a drive without springs is used, such as a lead screw drive. The second drive comprises a pneumatic jack, which, on the one hand, in the case of a multi-cavity press device, enables small variations in the filling level of the volume of the moulding cavities to be compensated for without the occurrence of respective differences in force and, on the other hand, by increasing the force exerted by the pneumatic jack, enables provision of sufficient pressure during hardening. The former cannot be achieved by means of springs. After all, in the case of spring constructions, a given position of the springs would lead to a different pressure of the springs and the forces would differ. By applying a constant pressure on a pneumatic jack, a different travel can be achieved by means of different press plungers, though the forces between the plungers are the same. Control of the pneumatic jack during hardening is achieved by fitting a sensor in the mould.

Both the known hydraulic systems and the known mechanical systems are fitted with a protection system which, on the one hand, prevents the device from being damaged if one of the plungers jams and, on the other hand, ensures that in multi-cavity devices the other plungers can continue their path. For this purpose spring constructions have been used, which, however, have the disadvantage that when one of the plungers jams, the entire feed path, which is relatively long, is taken up by the spring. Consequently, a very large force acts on the system at the end of the stroke.

According to an advantageous embodiment of the invention, the carriage is mounted displaceably on a frame construction in order to carry out the first part of the plunger stroke by displacement. In this embodiment, the carriage comprises two supports which are displaceable with respect to one another, a first support being mounted displaceably on the frame construction and the second support accommodating the press plunger. In this arrangement, the supports are secured to one another by means of securing means which act as protection means, which securing means are designed to provide a fixed connection up to a certain force on the supports and to disengage the supports when this force is exceeded. In this way, it is still possible to provide protection against overload at increased pressure during the first part of the stroke, without using a spring construction. Even though this increased pressure is much lower than the final pressure when the material is being pressed, it is sufficiently high to be able to cause undesirable damage during the first part of the pressing action.

Preferably, locking means are present for interlocking the first and second supports in a disengageable manner so that the securing means, which secure the supports to one another in a disengageable manner, are not activated during the second part of the stroke. Moreover, in this case, a press device is present on the carriage for providing the final pressure which is required for squeezing out the entrapped air and for the hardening in the mould cavity. In this case, the press device does not travel, or hardly travels. The larger force exerted by said press device would displace the two supports with respect to each other if the locking means described above were not present. Said press device may be designed to carry out a relatively small stroke. Due to the combination of these two movement mechanisms, it is possible to dispense with hydraulic means or known mechanical means using spring constructions.

According to an advantageous embodiment, the press device comprises a press jack and a lever arm connected thereto, which lever arm on the other side acts on the press plunger, the press plunger and the lever arm being mounted on the second support.

The locking means may comprise all the means known in the state of the art, such as a piston-cylinder assembly mounted on the one support, the piston engaging a bore provided in the other support. The securing means may comprise all coupling constructions which can easily be disengaged. According to an advantageous embodiment, said constructions consist of a spring-loaded ball which is held in a bore in the one support in such a manner that it projects slightly and of a bore in the other support which fits tightly around the projecting part of the ball. It is also possible to design the spring-loaded ball in such a way that the locking unit becomes superfluous. That is to say that the threshold value at which the safety means comprising the spring-loaded ball become active have to be set higher than the force exerted during the hardening of the fluid in the mould.

According to an advantageous embodiment, the press plunger comprises a press plunger rod and a push rod so that the press plunger does not have to be replaced completely when defects occur. Only the press plunger rod, which is most liable to damage, protrudes from the device and can be replaced in a relatively simple manner.

The device described above is preferably used for encapsulating semiconductor components in a mould. In this arrangement a plurality of plungers for a mould cavity may be present. As a result, optimum filling of the mould cavity as well as optimum mechanical properties of the plastic material may be obtained.

The invention also relates to a system for controlling the final moulding pressure in a mould cavity, comprising a device as described above, a sensor measuring the final moulding pressure, comparing means which compare the signal from the sensor with an optimum value which has been stored in the memory of the comparing means, and control means, regulated by the comparing means, for controlling the press device. In this way, the final moulding pressure in the mould cavity can be determined in a very accurate manner, without using springs. By means of the closed loop, many different process variables can be compensated for without the pressure in the mould cavity changing. It is also possible to adapt in a simple manner to different products by changing the values stored in the comparing means.

BRIEF DESCRIPTION OF THE DRAWINGS

The invention will be explained in more detail below with reference to an exemplary embodiment illustrated in the drawing, in which:

FIG. 7 shows a detail of the upper and lower mould and a diagrammatic view of a closed loop for the control of the moulding pressure.

DESCRIPTION OF THE PREFERRED EMBODIMENTS

Figure 1:
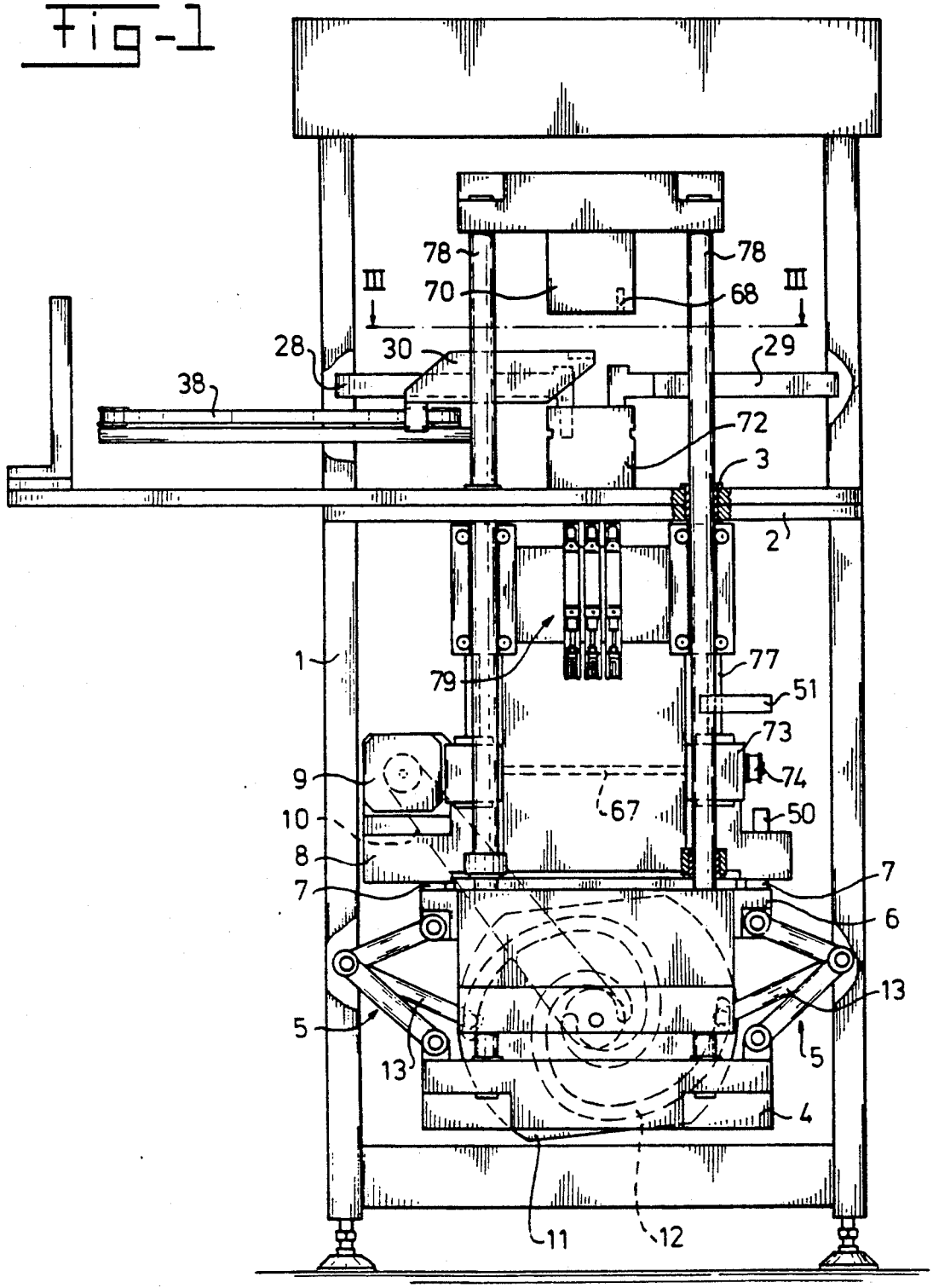
FIG. 1 diagrammatically shows a front view of the press according to the invention, in the open position.
Figure 2:
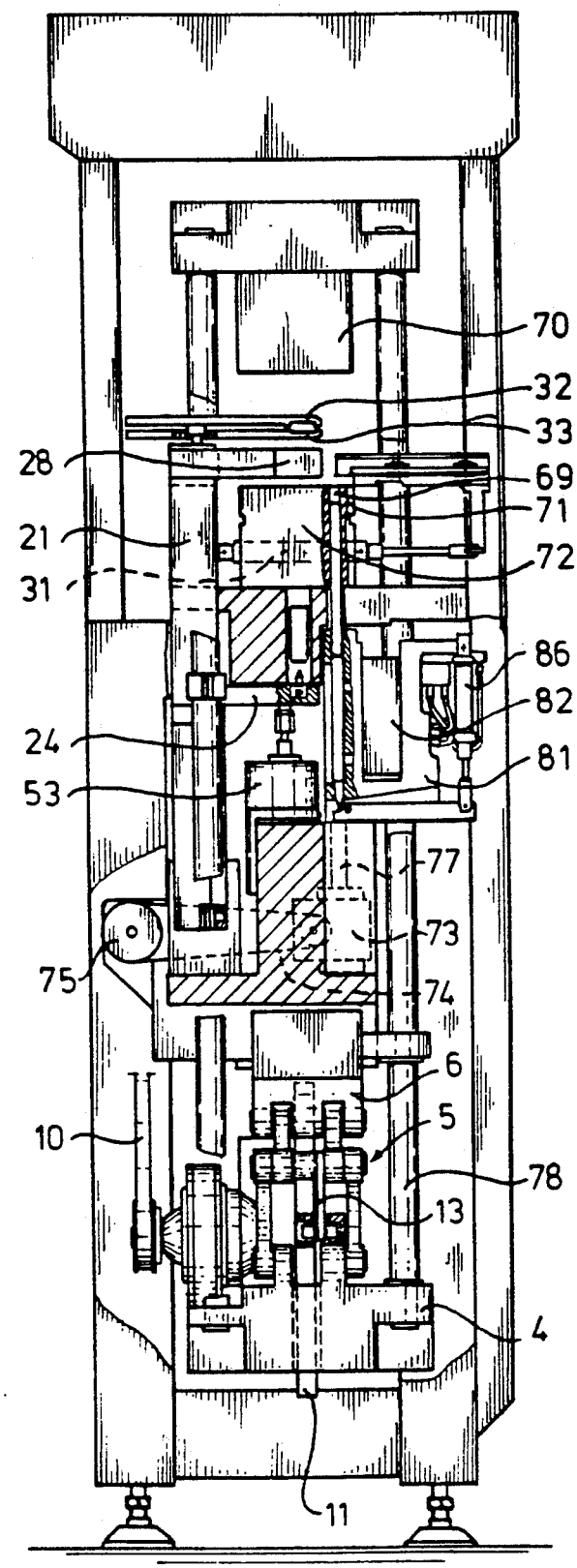
FIG. 2 shows a side view of the device according to FIG. 1, in the open position.
Figure 5:
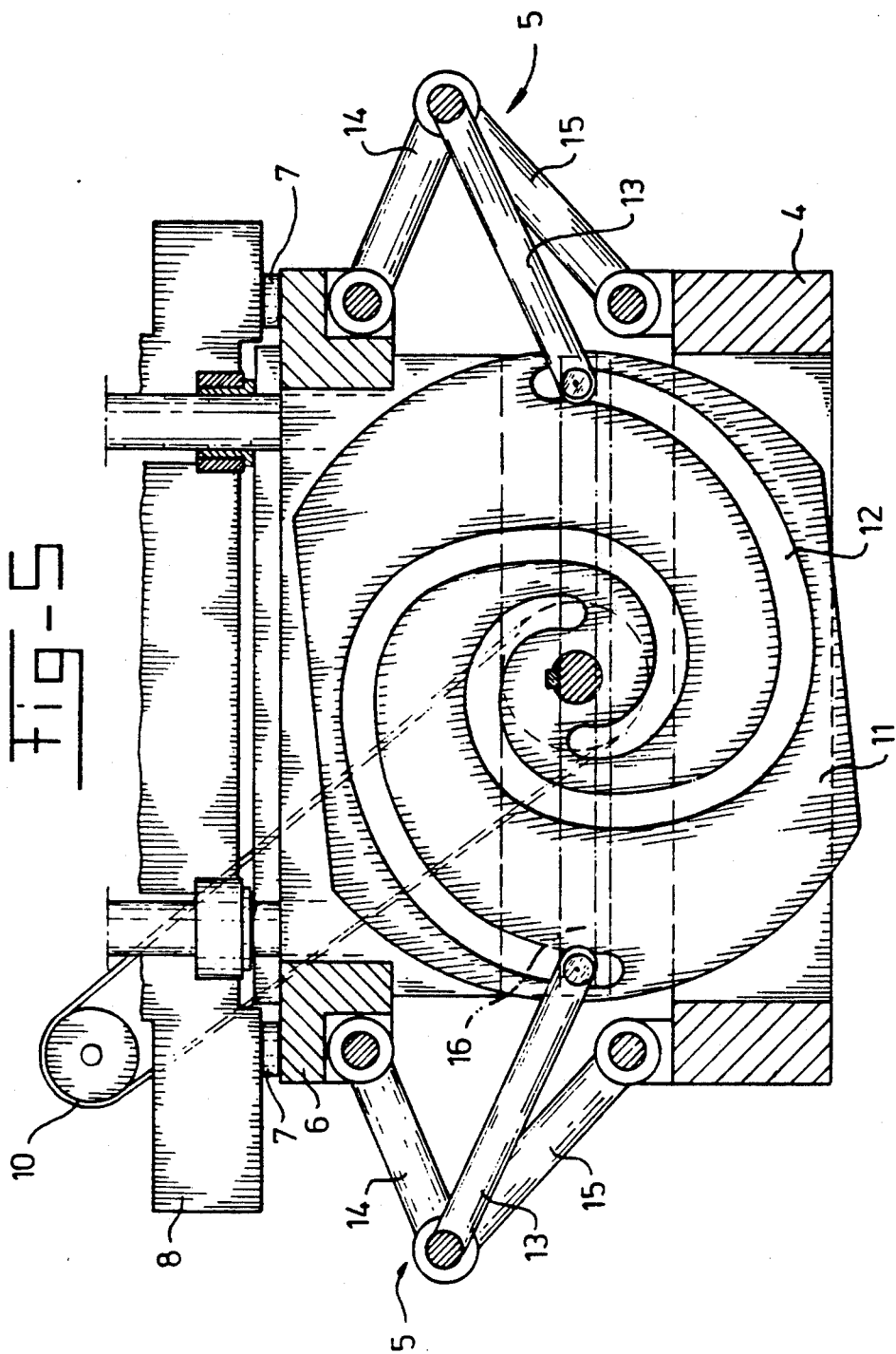
FIG. 5 shows a detail of the opening and closing mechanism of the press.

The press device according to the invention comprises a frame 1, as shown in FIG. 1 and 2. A cross plate 2 is provided in frame 1, onto which cross plate 2 a lower mould 72 is fitted in a fixed manner. Provided in cross plate 2 are guide bores 3, through which tie bars 78 are guided so as to be slidable backwards and forwards. A carriage 79 is guided on the tie bars 78 in a slidable manner. Control of the carriage 79 is effected by a lead screw 77. On carriage 79 is fitted the moulding part of the device, which part will be described in more detail below. Tie bars 78 are connected on one side to the upper mould 70 and, on the other side, to the lower plate 4. The lower plate 4 is connected via a joint lever mechanism 5 to upper plate 6, which upper plate 6 is connected, via pressure sensors 7, to the carrying plate 8 which, together with cross plate 2, is firmly connected to frame 1. Motors 9 and 75 are fitted on carrying plate 8. Sensor 50, of carrying plate 8, is arranged to co-operate with protruding part 51 which is mounted on bar 78. Motor 9 is linked to a cam disc 11 via a transmission 10, an arm 13 of the joint lever mechanism 5 engaging on the cam tracks 12 of said cam disc. This arrangement is shown more clearly in FIG. 5. As can be seen in this figure, in addition to arm 13, arms 14 and 15 are also present. In addition to being guided in the cam tracks 12, the arms 13 are guided in a horizontal guiding groove 16 which is firmly connected with upper plate 6. As a result of their combined guiding in the cam tracks 12 and the horizontal guiding groove 16, the fastening points of the arms 13 at the cam disc can only carry out a reciprocating movement in the horizontal plane of FIG. 5 when the cam disc 11 rotates.

The moulding part of the device operates as described below.

When the motor 9 is driven, which motor 9 may be a motor of the type which can deliver a considerable torque even during idling, the cam disc 11 will rotate. Starting from the position shown in FIG. 1 and 5 and assuming that motor 9 rotates anti-clockwise, the arms 13 which are in the horizontal guiding groove 16 will be moved towards each other, i.e. towards the centre of the cam disc, by means of the cam tracks 12. As a result thereof the arms 14 and 15 are moved apart and consequently the lower plate 4 moves down relative to the fixed carrying plate 8. A special course of the movement can be achieved by a simple design of the groove 12. During the first part of the closing movement, the motor 9 is controlled in such a manner that it delivers a relatively low torque. Therefore, if the two halves of the mould for some reason cannot be closed completely (if an object to be encapsulated has been inserted the wrong way round), this will not result in damage, but the closing movement will be brought to a halt. In this case, pre-tensioned spring constructions, such as are being used in the state of the art, are undesirable. After the closing movement has stopped at the relatively low torque, projection 50 and sensor 51 are used to determine whether the mould halves are positioned one on top of the other. Should this not be the case, an alarm signal is emitted. If correct positioning is confirmed, the motor is controlled in such a way that it delivers a higher torque during idling and thus the closing force exerted on the mould halves is sufficient to overcome the transfer and hardening pressure. In this case, the arms 14 and 15 are preferably virtually in the vertical position, whereby maximum transmission is provided between the motor 9 and the force exerted on the upper mould 70. After moulding has finished, the upper mould 70 may be moved away from the lower mould by driving the motor 9 in the opposite direction.

Figure 3:
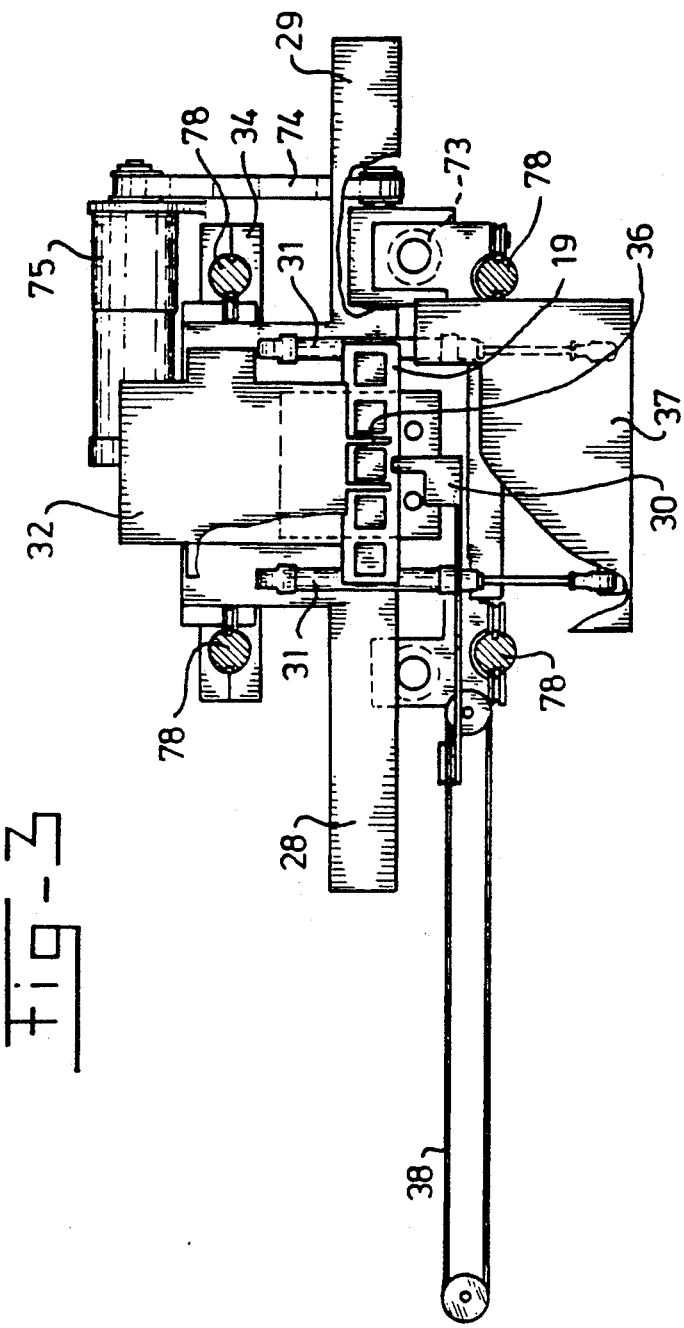
FIG. 3 shows a cross section along the line III—III of FIG. 1.
Figure 4:
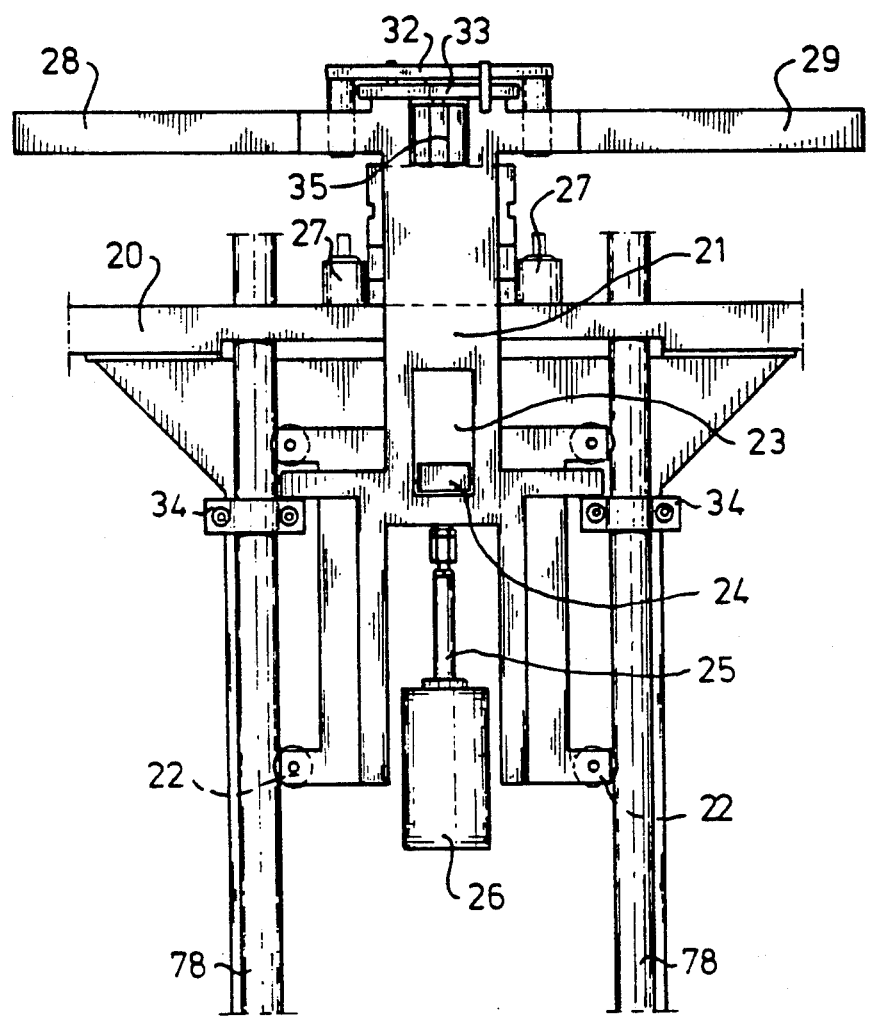
FIG. 4 shows a side view of a detail of the feed and discharge system for lead frames in the mould.

When the mould halves 70 and 72 are being closed together, a so-called lead frame 19 must be present in the mould cavity which is denoted overall by 18 in FIG. 7, which lead frame contains an integrated circuit (not shown). With regard to the supply of said lead frame, particular reference is made to FIG. 3 and 4, which show that two stops 34 and a supporting plate 20 fastened thereto are connected to bars 78. A carriage 21 which, as can be seen in FIG. 4, rests on stops 34, is guided slidably by means of rollers 22 on bars 78. An aperture 23 is provided in carriage 21, in which aperture a stop 24 connected to an ejection device 54 (FIG. 7) is present. The dimensions of aperture 23 and stop block 24 are adapted to one another in such a way that the carriage 21 can travel half the complete stroke of the upper mould. Carriage 21 is connected to the piston rod 25 of air cylinder 26 which, as is shown in FIG. 2, is firmly connected to carrying plate 8. Cylinders 27 are present on carrying plate 8 or cross plate 2 or supporting plate 20, which cylinders act on an upper gripper 32. At its upper side, carriage 21 is fitted with arms 28 and 29. A gripper cylinder 35 is provided in the carriage 21, which gripper cylinder 35 acts, on the other side, on an upper gripper 32 which co-operates with lower gripper 33 (see also FIG. 2). Upper gripper 32 is equipped with gripper fingers 36 (FIG. 3). Lower gripper 33 is likewise equipped with fingers (not shown) for gripping lead frame 19.

Drive cylinders 31 are provided for moving degate plate 37 (cf. FIG. 3 and 7) backwards and forwards. A conveyor belt 38 and a conveying plate 30 are firmly attached to arm 28 of carriage 21 in a manner not shown in further detail, i.e. they move along with upper mould 70. Conveying plate 30 is designed to engage on the lead frame 19. The operation of the abovementioned conveying mechanism is described below.

When the upper mould half is in the completely open position, the arms 28 and 29 are in the position shown in FIG. 4. During this state, the conveying of the lead frame is effected by means of the conveying plate 30 and belt 38. After the lead frame has been inserted in the grippers 32, 33, the arms 28, 29 will move down towards the supporting plate 20 together with the upper mould when this is moved downwards. In this case, the conveying plate moves along in a vertical direction and is able to move back in a horizontal direction. During the downward movement, the upper and lower grippers are closed in order to hold the lead frame between them. Gripper 32 abuts cylinders 27 (which extend) before aperture 23 abuts stop 24. The upper gripper 32 stays behind until aperture 23 abuts stop 24, as a result of which the lead frame can position itself freely in lower mould 72, as shown diagrammatically in FIG. 7. The upper side of the groove 23 comes to bear against stop 24 when approximately half of the downward stroke performed by upper mould 70 has taken place. The grippers have now brought the lead frame into the correct position in the lower mould 72.

In this arrangement, means are present in the upper and/or lower mould to accommodate the gripper fingers 36. When the mould is being closed, the gripper fingers are free and lead frame 19 is brought into position by the centering means (not shown). Subsequently, material is forced into the mould cavity, as will be explained in more detail below. At that stage, the degate plate 37 is not located between the mould halves 70 and 72, i.e. in FIG. 7 it has been moved from the area of the parting line between the mould halves by the drive cylinders 31. After the material has been introduced around lead frame 19, the upper mould half 70 moves upwards again, the now encapsulated part remaining in the mould cavity of the lower mould 72. During this upward stroke, degate plate 37 moves into the position, shown in FIG. 7, between the upper mould half 70 and the lower mould half 72. Shortly before the carriage 21 is taken along by stop 34, the cylinders 27 and 35 retract so that the grippers engage on the lead frame. The cylinder 26 is driven inwards in such a way that it pulls on carriage 21. Cylinder 53 which controls stop 24 is driven outwards in the same way. Cylinder 26 thereby prevents cylinder 53 from moving upwards. This state is maintained during the first half of the opening stroke. The grippers retain their grip on the lead frame.

During the second half of the opening stroke, the carriage 21 is taken along upwards by the stops 34. Stop 24 and thus the ejector mechanism 54 follow the upper side of aperture 23 because the stops 34 override the action of the cylinder 26.

Thus the closed grippers 32 and 33 and the ejector mechanism 54 travel upwards in a synchronous manner via stop 24, and the sprue remnants are broken off the product and held in the lower mould 72. As a result of breaking off the sprue at the moulding temperature, the bond with the lead frame is relatively weak, so that a perfect finish can be obtained using relatively little force and without risk of damage to the lead frame or the capsule of the integrated circuit.

Subsequently, the arms 28 and 29 move away from the supporting plate 20 and move along upwards with the upper mould 70, the lead frame being gripped by the grippers. At the end of the movement stroke of the upper mould, the vertical conveying of the lead frame 19 is repeated in the manner described above and the encapsulated part in FIG. 3 is moved one position to the right.

The device for introducing plastic material under pressure into the mould cavity will be described in more detail below with reference to FIG. 2 and FIG. 6. This device comprises a carriage 79, which carriage 79 is guided slidably in tie bars 78. Motor 75 is connected to the stationary part of the device and drives gearboxes 73 via transmission 74 and rod 67. Gearbox 73 in turn drives lead screw 77 with which carriage 79 can be moved upwards and downwards (not shown in more detail). The motor 75 is of such design that it regulates the movement of the plunger over its entire speed range in a controlled manner.

Figure 6:
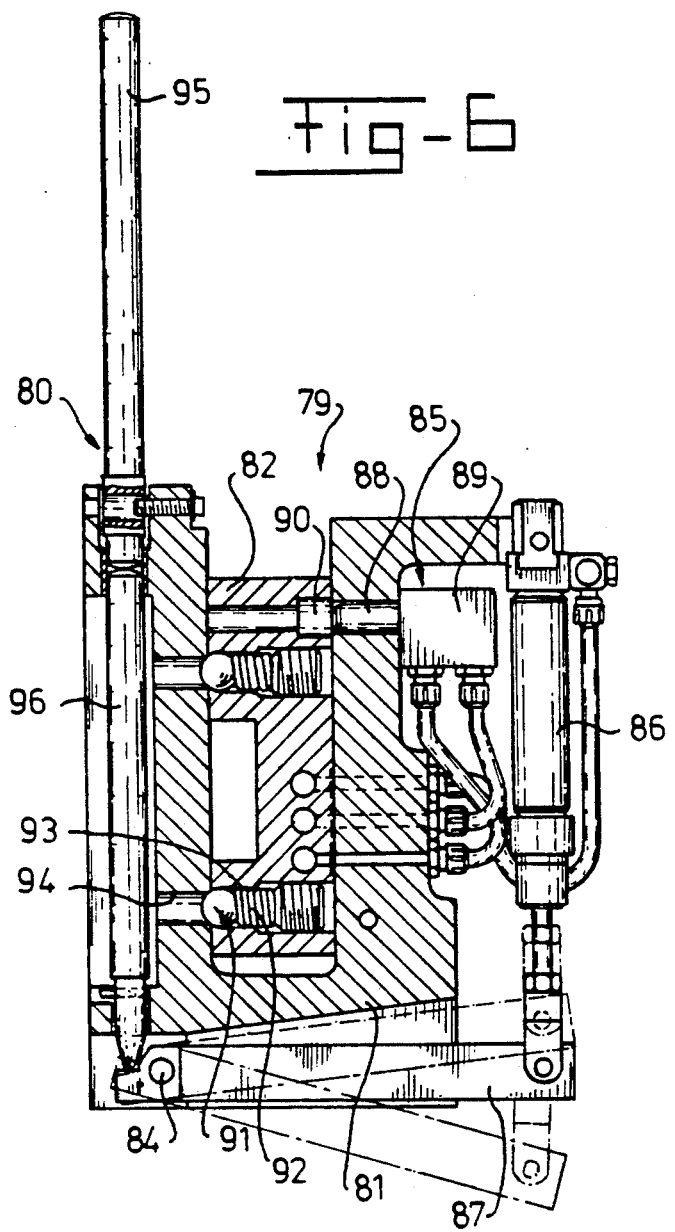
FIG. 6 shows a detail of the press plunger for injecting plastic into the mould cavity.

FIG. 6 shows that carriage 79 comprises a first support 82 and a second support 81. The lead screw 77 acts on the first support 82. The drawing shows that the second support 81 is fitted in a U shape around the first support. Bores 93 are provided in the first support 82, which bores accommodate the balls 91 loaded with springs 92, which balls drop into corresponding bores 94 of the second support 81. In addition, a piston-cylinder assembly 88, 89 is attached to the second support 81, while a bore 90 has been provided in first support 82. Piston-cylinder assembly 88, 89 (i.e. locking means 85) can be controlled by means of air hoses connected thereto, which air hoses are attached to a control device (not shown in more detail). An air cylinder 86 is also fitted on second support 81, the reciprocating part of which cylinder acts on a lever arm 87 which acts, via a substantial lever transmission, on thrust rod 96 which in turn acts on press plunger rod 95 which is accommodated in lower mould 72 containing a heater 71 (not shown in more detail).

FIG. 7 diagrammatically shows part of the upper and lower mould and indicates more clearly that pressure sensor 68 is connected to the comparing means 45 where the desired value for the present product is stored. Comparing means 45 act on control means 46 which in turn act on air cylinder 86.

The part of the device described works as follows:

After the upper mould 70 has been closed onto the lower mould 72, a lead frame containing an integrated circuit having been accommodated in the mould cavity and a plastic material having been introduced in bore 69, said plastic material is rendered fluid by the heater 71 and the press force. As a result of driving the motor 75, the first and second support, i.e. carriage 79, move upwards and air cylinder 86 is in the extended activated position. By variation of the height of the pallets, the vertical position of 95 and 96 will also vary. As a result, the position of 86 will also be able to vary in the idling phase. The extreme positions are indicated by dotted lines and broken lines, which position is always unknown. Under these conditions, the plunger rod 95 will travel the relatively long transport path at a relatively low pressure. In order to prevent damage to the connection between the integrated circuit and the lead frame, it is important that the fluid flow should not become too large during this first phase. During the upward movement, the locking means 85 are in the unlocked position, i.e. the piston 88 is outside the aperture 90. If, during this upward movement, the pressure should, for any reason, exceed a set threshold value which is much lower than the final moulding pressure, but higher than the normal filling pressure, the force with which springs 92 force balls 91 into bore 94 will be overcome as soon as that set value is exceeded. In this case, first support 82 continues its movement whereas the second support 81 stays behind. Moreover, at the same time, the air supply to the locking means 85 and air cylinder 86 is interrupted so that these can no longer be operated. An overload protection of this kind has the advantage that an on/off state is provided. That is to say, the protection system is either active or inactive and if it is inactive, it has no effect on the overall functioning of the device. In addition, the protection system can easily be replaced.

If protection is not required, piston 88 will be moved out of cylinder 89 when the end of the transport or transfer stroke is reached, i.e. the locking means 85 interlock the first and second support, as a result of which the securing means 84, consisting of the spring-loaded balls, are not activated when a given pressure is exceeded. Furthermore, motor 75 is switched off. Subsequently the much higher final pressure has to be generated, which is achieved by means of air cylinder 86. Since the plastic is essentially incompressible and there is still a small amount of gas present, the generation of the final moulding pressure may be regarded as a static process. The generation of the final moulding pressure can be achieved independently of the position of the air cylinder 86. The position of arm 87 is dependent on the amount of plastic introduced. During application of the pressure for hardening, there is essentially no movement of the arm 87. This relatively high moulding pressure may be generated by a combination of the air cylinder 86 and the lever ratio of lever 87. This force is sufficient as the final pressure and is independent of the securing means 84. This is contrary to the state of the art where various spring constructions are used and the spring force has to be overcome to apply the final pressure, as a result of which it is not possible to determine the final pressure in an accurately controlled manner. The pressure is measured constantly with the aid of the sensor 68 which is located in the upper mould (FIG. 7). The signal originating from this sensor is compared in comparing means 45 with the desired value stored in the memory of said means. In dependence on the outcome of this comparison, the control means 46 are operated to supply a higher, lower or unchanged pressure to the air cylinder. The control may be carried out by electronic means as well as by completely pneumatic means.

It is also evident from FIG. 6 that the plunger comprises a plunger rod 95 and a thrust rod 96. Construction of the plunger in several parts means that when the press plunger rod 95 is damaged, only this part and not the thrust rod in the carriage 79 needs to be replaced. The construction and the replacing may be effected with the aid of a simple securing construction, as shown in FIG. 6. Supplying the pressure in two stages by two separate means gives the advantage that very effective means can be constructed for protection at low pressure, while the high-pressure mechanism can be of relatively simple construction. It is obvious that these two separate movements can be achieved by other means. Thus it is possible to effect the first part of the stroke by means of an air cylinder which applies a relatively controlled speed to the plunger rod 95.

I claim:

1. A device for introducing a plastic material into a mould after a mould cavity of said mould has been closed, said device comprising:
   a carriage which is displaceable relative to said mould;
   a press plunger fitted on said carriage which is displaceable relative to said mould, said press plunger configured to be displaceable relative to said carriage;
   a first drive configured to move said carriage relative to said mould to carry out a first movement of said press plunger with a large stroke at a controlled speed and at relatively low pressure, wherein said first drive is a mechanical drive;

a second drive configured to move said press plunger relative to said carriage to carry out a second movement of said press plunger with a smaller stroke at a relatively higher pressure, wherein said second drive comprises a pneumatic jack device and a control for said pneumatic jack device;

a sensing means in said mould for determining the pressure prevailing therein, said sensing means connected to said control of said pneumatic jack device; and a safety coupling releasably connecting said press plunger to at least a portion of said carriage and said first drive, wherein said safety coupling provides said connection up to a certain force and releases said connection above said certain force.

2. A device for introducing a plastic material into a mould after a mould cavity of said mould has been closed, said device comprising:

a frame construction;

a carriage which is displaceable relative to said mould, in which said carriage is mounted displaceably on said frame construction, said carriage comprising two supports which are displaceable with respect to one another, a first support being mounted displaceably on said frame construction and a second support;

a press plunger attached to said second support of said carriage such that said press plunger is displaceable relative to said mould, said press plunger configured to be displaceable relative to said carriage;

a first drive configured to move said carriage relative to said mould to carry out a first movement of said press plunger with a large stroke at a controlled speed and at relatively low pressure, wherein said first drive is a mechanical drive;

a second drive configured to move said press plunger relative to said carriage to carry out a second movement of said press plunger with a smaller stroke at a relatively higher pressure, wherein said second drive comprises a pneumatic jack device and a control for said pneumatic jack device; and a safety coupling comprising securing means for said supports of said carriage, which said securing means are designed to provide a fixed connection between said supports up to a certain force on said supports and to disengage said supports when this force is exceeded.

3. A device according to claim 2, in which said safety coupling comprises locking means for interlocking said first and second supports in a disengageable manner, and in which said pneumatic jack device is present on said carriage for moving said plunger relative to said carriage and generating the final pressure in said mould cavity.

4. A device according to claim 2, in which said pneumatic jack device comprises a pneumatic jack and a lever arm which is connected thereto on one end and on the other end acts on said press plunger, said pneumatic jack and said lever arm being mounted on said second support.

5. A device according to claim 1, in which said mechanical drive comprises a lead screw device.

6. A device according to claim 2, in which said securing means comprise a spring-loaded ball which is held in a bore in one of said supports in such a manner that it projects slightly, and a bore in the other of said supports which fits tightly around the projecting part of said ball.

7. A device according to claim 1, in which said press plunger comprises a press device and a thrust rod.

8. A device according to claim 1, in which said mould cavity is designed to encapsulate integrated circuits and in which various plungers introduce material into said mould cavity.

9. A device according to claim 1, in which said control of said pneumatic jack device comprises a comparing means which compares the signal from said sensing means with an optimum value which has been stored in a memory of said comparing means, and control means regulated by said comparing means for controlling said pneumatic jack device.

10. A device according to claim 2, in which said control of said pneumatic jack device comprises a comparing means which compares the signal from said sensing means with an optimum value which has been stored in a memory of said comparing means, and control means regulated by said comparing means for controlling said pneumatic jack device.

11. A device according to claim 2, in which said mechanical drive comprises a lead screw device.

12. A device according to claim 2, in which said press plunger comprises a press device and a thrust rod.

13. A device according to claim 3, in which said pneumatic jack device comprises a pneumatic jack and a lever arm which is connected thereto on one end and on the other end acts on said press plunger, said pneumatic jack and said lever arm being mounted on said second support.

14. A device according to claim 13, in which said securing means comprise a spring-loaded ball which is held in a bore in one of said supports in such a manner that it projects slightly, and a bore in the other of said supports which fits tightly around the projecting part of said ball.

15. A device according to claim 14, in which said control of said pneumatic jack device comprises a comparing means which compares the signal from said sensing means with an optimum value which has been stored in a memory of said comparing means, and control means regulated by said comparing means for controlling said pneumatic jack device.

16. A device according to claim 3, in which said securing means comprise a spring-loaded ball which is held in a bore in one of said supports in such a manner that it projects slightly, and a bore in the other of said supports which fits tightly around the projecting part of said ball.

17. A device according to claim 3, in which said control of said pneumatic jack device comprises a comparing means which compares the signal from said sensing means with an optimum value which has been stored in a memory of said comparing means, and control means regulated by said comparing means for controlling said pneumatic jack device.

18. A device according to claim 4, in which said control of said pneumatic jack device comprises a comparing means which compares the signal from said sensing means with an optimum value which has been stored in a memory of said comparing means, and control means regulated by said comparing means for controlling said pneumatic jack device.

19. A device according to claim 4, in which said securing means comprise a spring-loaded ball which is held in a bore in one of said supports in such a manner that it projects slightly, and a bore in the other of said supports which fits tightly around the projecting part of said ball.

20. A device according to claim 6, in which said control of said pneumatic jack device comprises a comparing means which compares the signal from said sensing means with an optimum value which has been stored in a memory of said comparing means, and control means regulated by said comparing means for controlling said pneumatic jack device.

* * * * *